R. W. & S. ACKLEY.
Running-Gear.
No. 43,276.
Patented June 28, 1864.
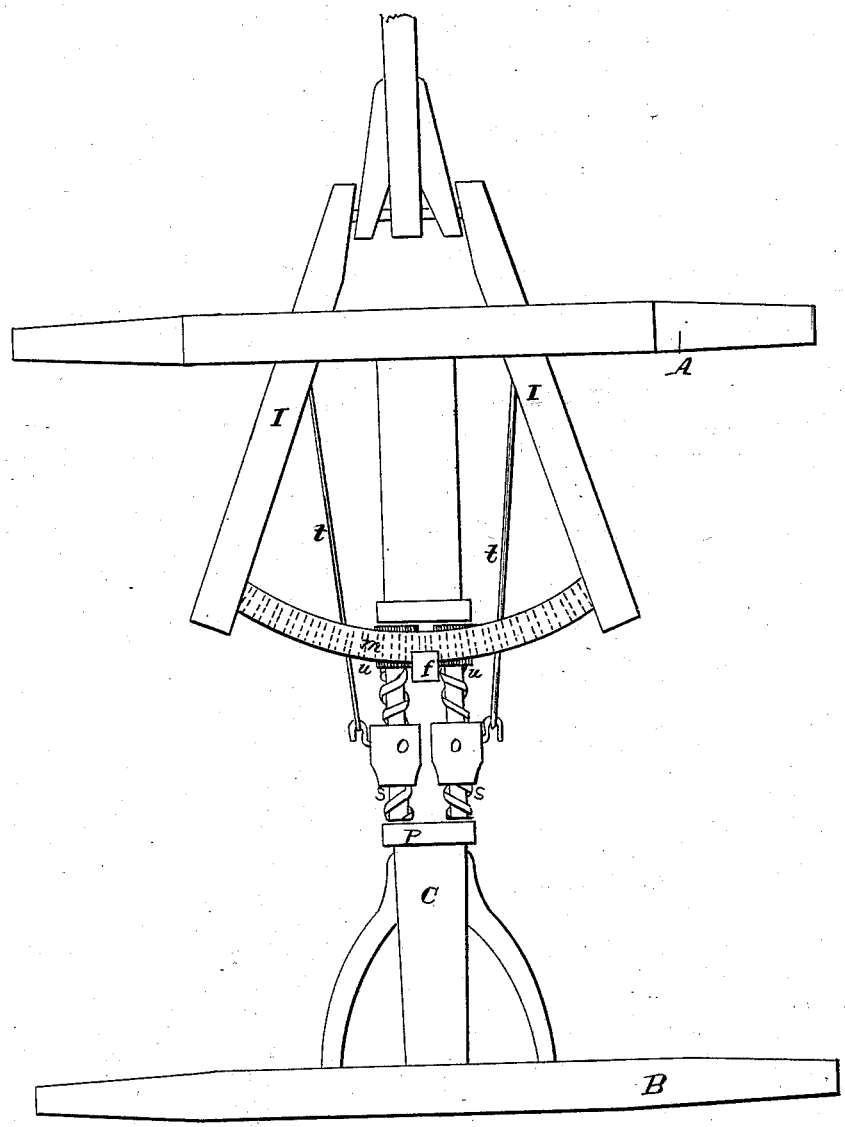
Witnesses
Inventor
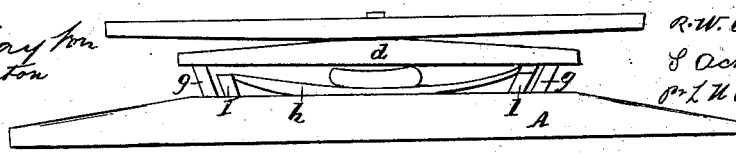

UNITED STATES PATENT OFFICE.

RODNEY W. ACKLEY AND SAMUEL ACKLEY, OF LIMA, MICHIGAN.

IMPROVEMENT IN WHEEL-VEHICLES.

Specification forming part of Letters Patent No. 43,276, dated June 28, 1864.

*To all whom it may concern:*

Be it known that we, RODNEY W. ACKLEY and SAMUEL ACKLEY, of Lima, Washtenaw county, in the State of Michigan, have invented certain new and useful Improvements in Wheel-Vehicles; and we hereby declare that the following is a true and exact description of the same, reference being had to the accompanying drawings, and to the letters of reference marked thereon.

The nature of my invention consists in the use of certain mechanical devices to facilitate the short turning of vehicles without jostling the tongue.

Figure 1 in the annexed drawings represents a plan view of my invention. Fig. 2 represents a front elevation of front axle with its attachment.

The letter A in Fig. 1 represents the front axle, the letter B the hind axle, and C the coupling-pole.

$d$ on axle A designates a rest, on which the bolster $e$ plays with a horizontal circular motion, being penetrated at its center by a bolt, which also goes through the rest $d$, coupling-pole $c$, and axle-tree A. The rest $d$ is fastened at its ends to the blocks $g$ $g$, these blocks being bolted to the axle-tree A. Between the axle A and the rest $d$ is the tie $h$, which serves to bind the hounds I together. The tie $h$ is slightly concave at its upper surface, on which the end of the coupling-pole rests. The hounds I are fastened at their front ends to the tongue with a bolt, on which it can play with a vertical motion. The rear ends of the hounds I are connected together by the segment of a cog-wheel, $m$. The segment $m$ gears into the two pinions $n$, which form the heads of screws $s$. The thread of one screw, it will be remarked, is cut of them, to run from left to right and the other from right to left, so that when operated by means of the pinions on them the nut on one will advance while the other nut recedes. The nuts $o$, which are thus operated by screws $s$, are attached by a hook to the rods $t$. The other end of said rods $t$ are fastened to rest $d$. Screws $s$, at their points, have their bearing in P.

$f$ represents a bolt with a shoulder on one side of the head, which rests on the segment $m$ to keep it in position when in motion.

By this arrangement it will be seen that when standing in front and facing the vehicle, if you turn the tongue to the right, the operation of segment $m$ on the left pinion $n$ will drive the screw around and draw the nut $o$, through which it works, forward in the direction of the tongue. At the same time the nut $o$ on the opposite side will be forced back, and, as a necessary result of this action, the axle-tree A will be placed in an oblique position, its left end being greatly in advance. By turning the tongue to the left the action of pinions $n$, nuts $o$, and screws $s$ will be reversed and the right-hand end of the axle-tree will be in advance.

The chief advantage which I claim for my invention is that the tongue is controlled in its lateral motion, and therefore cannot strike violently against the horses' legs as it does in vehicles of ordinary construction.

Having thus described our invention, what we claim, and desire to secure by Letters Patent, is—

The screws $s$, the nuts $o$, the rods $t$, and the rest $d$, the whole constructed, arranged, and operated in the manner and for the purpose substantially as herein set forth.

SAML. ACKLEY.
RODNEY W. ACKLEY.

Witnesses:
C. B. STEDMAN,
EMMA A. STEDMAN.